United States Patent
Grass

(10) Patent No.: US 10,260,169 B2
(45) Date of Patent: Apr. 16, 2019

(54) METHOD FOR THE PRODUCTION OF SUPERABSORBENT PELLETS AND/OR OF A FIBROUS MATERIAL FROM CROP RESIDUES

(71) Applicant: SORBA ABSORBER GmbH, Fribourg (CH)

(72) Inventor: Stefan Grass, Biel (CH)

(73) Assignee: Cormo AG, Fribourg (CH)

( * ) Notice: Subject to any disclaimer, the term of this patent is extended or adjusted under 35 U.S.C. 154(b) by 166 days.

(21) Appl. No.: 15/314,119

(22) PCT Filed: May 28, 2014

(86) PCT No.: PCT/EP2014/061176
§ 371 (c)(1),
(2) Date: Nov. 28, 2016

(87) PCT Pub. No.: WO2015/180781
PCT Pub. Date: Mar. 12, 2015

(65) Prior Publication Data
US 2017/0198412 A1    Jul. 13, 2017

(51) Int. Cl.
*D01B 1/10* (2006.01)
*A01D 45/02* (2006.01)
(Continued)

(52) U.S. Cl.
CPC ............... *D01B 1/10* (2013.01); *A01D 45/02* (2013.01); *A01G 3/002* (2013.01); *A01K 1/0154* (2013.01); *A01K 1/0155* (2013.01); *B01D 15/00* (2013.01); *B01D 53/46* (2013.01); *B01D 53/52* (2013.01); *B01D 53/58* (2013.01); *B01D 53/62* (2013.01);
(Continued)

(58) Field of Classification Search
None
See application file for complete search history.

(56) References Cited

U.S. PATENT DOCUMENTS 2,044,297 A *  6/1936  Hartenstein ............... C05B 7/00
                                                        71/23
4,002,010 A *  1/1977  Da Silva Passos .... A01D 41/08
                                                        56/126

(Continued)

FOREIGN PATENT DOCUMENTS

DE    42 22 139    1/1993
EP    0 470 596    2/1992

*Primary Examiner* — Wayne A Langel
(74) *Attorney, Agent, or Firm* — Clark & Brody

(57) ABSTRACT

The method of the invention comprises the following steps:
(i) cutting the maize stalks so as the less leafy stalk segments, higher than 70 cm, stay on the field;
(ii) cutting the less leafy stalk segments as close to the ground as possible;
(iii) harvesting the less leafy stalk segments cut in step (ii);
(iv) cutting the in step (iii) harvested less leafy stalk segments into 5-50 mm stalk sections;
(v) providing a mechanical impact to the stalk sections of step (iv) to obtain a mix containing:
  f1. said spongy cores forming the superabsorbent pellets fraction,
  f2. said elongated fiber pieces forming the fibrous matter fraction,
  f3. and said leaf matter forming the leafy fraction,
(vi) separating the 3 fractions from each other;
(vii) recovering the three fractions f1-f2-f3;
The invention also pertains to the so obtained products and to their uses in treatments of liquids or gases.

18 Claims, 2 Drawing Sheets

(51) Int. Cl.

| | | |
|---|---|---|
| *C05F 11/00* | (2006.01) | |
| *A01G 3/00* | (2006.01) | |
| *B01J 20/24* | (2006.01) | |
| *B01D 53/52* | (2006.01) | |
| *B01D 53/46* | (2006.01) | |
| *B01D 53/58* | (2006.01) | |
| *B01D 15/00* | (2006.01) | |
| *B01D 53/72* | (2006.01) | |
| *B01D 53/62* | (2006.01) | |
| *B27N 5/00* | (2006.01) | |
| *C05F 5/00* | (2006.01) | |
| *A01K 1/015* | (2006.01) | |
| *B01J 20/02* | (2006.01) | |
| *B01J 20/04* | (2006.01) | |
| *B01J 20/28* | (2006.01) | |
| *B01J 20/30* | (2006.01) | |
| *B01J 20/32* | (2006.01) | |
| *B65D 65/00* | (2006.01) | |
| *A01G 24/23* | (2018.01) | |

(52) U.S. Cl.
CPC .............. *B01D 53/72* (2013.01); *B01J 20/02* (2013.01); *B01J 20/041* (2013.01); *B01J 20/24* (2013.01); *B01J 20/28016* (2013.01); *B01J 20/3021* (2013.01); *B01J 20/3035* (2013.01); *B01J 20/3206* (2013.01); *B01J 20/3293* (2013.01); *B27N 5/00* (2013.01); *B65D 65/00* (2013.01); *C05F 5/002* (2013.01); *C05F 11/00* (2013.01); *A01G 24/23* (2018.02); *Y02A 40/21* (2018.01); *Y02E 50/343* (2013.01); *Y02P 20/145* (2015.11); *Y02W 30/47* (2015.05)

(56) References Cited

U.S. PATENT DOCUMENTS

| | | | | |
|---|---|---|---|---|
| 4,519,340 | A | | 5/1985 | Dickey |
| 4,586,658 | A | * | 5/1986 | Eisenegger ............ B02C 13/13 241/19 |
| 4,690,224 | A | * | 9/1987 | Shwez ................ A01D 34/435 172/28 |
| 5,368,626 | A | * | 11/1994 | Schnuda ................ C05D 9/00 71/23 |
| 5,501,718 | A | * | 3/1996 | Bandurski ............. B01D 53/85 71/9 |
| 5,733,592 | A | * | 3/1998 | Wettstein ............. B07C 5/3425 209/577 |
| 2014/0075910 | A1 | | 3/2014 | Huang et al. |

* cited by examiner

METHOD FOR THE PRODUCTION OF SUPERABSORBENT PELLETS AND/OR OF A FIBROUS MATERIAL FROM CROP RESIDUES

TECHNICAL FIELD

The invention relates to a method for the production of new bio-sourced materials, especially absorbent materials and fibrous material.

The invention also pertains to the extraction of these new bio-sourced materials from plants, especially pith monocotyledonous flowering plants (preferably maize) and to transformation of the raw materials extracted from plants, into said new bio-sourced materials.

The invention also concerns said new bio-sourced materials per se, as well as their uses as superabsorbents; fibrous fillers, means for chemical treatments, means for purification of gaseous and/or liquid substances; means for depolluting; means for filtering; plant substrate component; fertilizer component; etc.

The implementation of said new bio-sourced materials in their numerous uses, as well as the preparation of the products/compositions derived from said new bio-sourced materials, are encompassed in the present invention.

BACKGROUND ART AND TECHNICAL PROBLEMS

There is a constant and eager need for high-performance absorbents and/or fibrous materials.

It is known that foams are absorbent materials used in many industries in enormous volume, e.g. for recording and retention of liquids, for insulation of buildings or for packaging. The vast majority of these foams is produced in the synthesis of fossil raw materials and thus is not available sustainably. Examples include polystyrene and polyurethane.

What is more, the use of synthetic co-polymers of acrylic acid and sodium acrylate as an absorbent in hygienic products, particularly in diapers increasingly extended.

The swelling capacity of these known absorbents is of course a crucial criterion of their performances.

The absorbent materials with high water absorption capacity could have also important applications as plant substrates or to improve compost mixtures. In this perspective, said absorbent materials must be biodegradable, which is obviously not true for the above mentioned the synthetic foams. Fibrous materials are a category of absorbents different from the foams, and which could be too in crop applications.

In these respects, bio-sourced materials appear to be good candidates as raw materials for the production of absorbents and/or fibrous products, which could be used in applications where their absorption, water-swelling and fixation capacities are required. Plants may so provide a sustainable supply of foams and/or fibrous materials enabling applications in the planting area.

DE 42 22 139 A1 describes a filler made from stem pieces of plants with a high content of pith, e.g from corn stalks. These used plants are in the mature state. The manufacturing process consists in cutting the plants, in picking out the leaves, in bundling and in drying the stalks, by leaving them laid in the field, up to reach a dry content of 80-90% by weight. The dried stalks are then cut into 0.5-10 cm length cylinders for use as pore former for porous building materials, such aerated concrete, insulation boards and tiles, as packaging material or as carriers for odoriferous substances against vermin or for plants fertilizer.

EP0470596A2 describes an absorbent material made from corn stalks in granulated form (granulometry comprised between 10 and 150 mesh: (2 mm-100 μm). The manufacturing method comprises the husking, the denoding, the crushing and the separation by vibrating sieving, or alternatively, a wet processing with subsequent dewatering and drying. Said absorbent material derived from maize stem is used to make a disposable absorbent article (diaper, woman's hygienic pad, compress). Said manufacturing method is not industrial and does not make it possible to separate the different components of the maize stalk, namely the pith, the bark, the leaves. The 2 mm-100 μm granulates according to EP0470596A2 contain a mixture of pith, bark and leaves.

The invention aims at addressing at least one of the above problems and/or needs:

a) Providing a method for the production notably of superabsorbent pellets and/or of a fibrous material from crop residues, said method being swift and industrial;
b) Providing a method for the production notably of superabsorbent pellets and/or of a fibrous material from crop residues, said method making it possible to separate easily and efficiently pith, bark and leaves;
c) Providing a method for the production notably of superabsorbent pellets and/or of a fibrous material from crop residues, said method making it possible to get some superabsorbent pellets which water absorption capacity is greater than or equal to 5 times its own weight and which largest dimension (length) is greater than or equal to 2 mm;
d) Providing a method for the production notably of superabsorbent pellets and of a fibrous material from crop residues, said method making it possible to get at an industrial scale and simultaneously and distinctively superabsorbent pellets and a fibrous material with different exploitable functionalities;
e) Providing a method for the production notably of superabsorbent pellets and/or of a fibrous material from crop residues, said method making it possible to get some superabsorbent pellets which density in a non-compressed form—expressed in kg/m3 is comprised between 10-100;
f) Providing superabsorbent pellets and/or a fibrous material having the above mentioned specifications: manufacturing features, absorption features; density;
g) Providing superabsorbent pellets useful as absorbent/filter/elimination means of gaseous and/or liquids products originating from animal excrements, liquid hydrocarbons, including oil and its derivatives or as support for chemical treatment of any substrate, said support possibly including at least one active ingredient, useful as processing aid;
h) Providing a fibrous material as fertilizer, and/or peat substitute, and/or as crop aid, packaging material, paper pulp, insulation material, or components thereof.

GENERAL DESCRIPTION OF THE INVENTION

Pursuing this goal, the inventor has had the merit to develop a new and improved method, which makes it possible to comply with at least one of the above mentioned objectives (a-h).

To that end, according to a first aspect, the invention proposes a method for the production notably of superabsorbent pellets and/or of a fibrous material from crop residues of monocotyledonous flowering plants (preferably maize) cultivation, comprising the following steps:
(i) cutting the maize stalks planted in the ground of the field below the lowest maize cob of the stalks, so as the less leafy stalk segments, which are preferably higher than or equal to—in an increasing order of preference—30; 50; 70 cm, stay on the field; each less leafy stalk segment including a spongy core, a stalk bark wrapping the core and a leafy matter wrapping the stalk bark or beared by the stalk;
(ii) cutting the less leafy stalk segments as close to the ground as possible;
(iii) harvesting the less leafy stalk segments cut in step (ii);
(iv) cutting the in step (iii) harvested less leafy stalk segments into stalk sections which largest dimension in mm—preferably their length—is comprised between—in an increasing order of preference—5-50; 8-40; 10-30;
(v) providing a mechanical impact to the stalk sections of step (iv) so as
   to separate their spongy cores from their stalk barks, as well as the leafy matter,
   to transform said stalk barks into elongated fiber pieces; and to obtain a mix containing:
     f1. said spongy cores forming the superabsorbent pellets fraction,
     f2. said elongated fiber pieces forming the fibrous matter fraction,
     f3. and said leaf matter forming the leafy fraction;
(vi) separating the 3 fractions from each other;
(vii) recovering the three fractions f1-f2-f3;
(viii) possibly reducing the f1 superabsorbent pellets up to a smaller pellet size comprised between 0.1-10 mm, preferably between 0.5-3 mm.

The present invention is based notably on the finding that a good separation between the different parts of the stalks, guarantees the performances the bio-sourced products as raw materials in various applications based on absorption capacities, low densities, filtering capabilities; insulation properties . . . .

The great issue of the invention is to have understood how deleterious are the different plant stalks components (pith/bark/leaves) with respect to each other and how important it is to optimize the fractioning of these components, to perfect the application properties of these bio-sourced refined raw materials.

The industrial and economic viability of the method according to the invention relies also on the fact that the recovering of the plants by-products is done so as to give a high added value to the recovered superabsorbent pellets and the fibrous material. It issues therefrom that the method according to the invention is competitive with respect to the ordinary transformation of the crop residues into the animal feeding industry.

But the challenge of the efficient separation was rather tricky in view of the high number and the diversity of the harvested crop residues. The mixture of these materials is very inhomogeneous and therefore unsuitable for industrial use.

The use of sponge tissue/pith in the technical field assumes that the sponge tissue/pith is separated from the other plant materials in whole or in part, so as the specific properties of sponge tissue/pith be expressed at the best.

Another difficulty which has been overcome by the method according to the invention, is to get different fractions of by-products having each a homogeneous density.

The method according to the invention is continuous or discontinuous. After the harvest step (iii) of the less leafy stalks, these latter are preferably immediately loaded into transportation means. They are then transferred to an area where they are stored before being processed in the following steps of the method according to the invention.

Definitions

These definitions are given herein as examples and are intended to facilitate the construction of the present paper.

Plurals are equivalent to Singulars and reciprocally.

"maize" stands for any monocotyledonous flowering plant analog to the maize per se.

"maize cob" corresponds to "maize ear"

"spongy" means porous, superabsorbent, made of plant pith i.e of parenchymatous cells.

The "lowest maize cob of the stalks of the field" below which the maize stalks are cut in step (i) of the method according the invention, corresponds preferably to the lowest maize ear as determined by the driver of the corn thresher.

The "less leafy stalk segments" are those which have a leaf ratio [g of leaves/g of leaves and stalk]×100, for example, and in an increasing order of preference: less than or equal to 50; 30; 10; 5%.

Preferences of the Invention

1. The Method

In a preferred way of implementation, the method is discontinuous and comprises a $1^{st}$ stage in the field wherein the steps (i)(ii)(iii) are implemented, a $2^{nd}$ stage of transportation of the harvested less leafy stalk segments, from the crop site to a possible storage area and/or to a processing site, a possible $3^{rd}$ stage of storage, and a final stage of processing the less leafy stalk segments, wherein the steps (iv) and the followings steps are implemented. Such a $3^{rd}$ stage of storage makes it possible notably to stabilize the harvested less leafy stalk segments, especially in terms of humidity, and to provide a buffer for the management of the following industrial production.

In a variant, the method according to invention comprises a drying stage of the harvested less leafy stalk segments, in order that the dry matter be greater than or equal to 70% by weight. This optional drying stage could happen before and/or after the cutting step (ii). Before the cutting step (ii), the stalks can be left standing on the field. After the cutting step (ii), the stalks can be dried in a storage area and/or by means of a dryer. Typically at a drying temperature of 60-120° C., the residence time in the range of 10 to 20 hours. At a higher drying temperature, the drying time is reduced accordingly.

According to favorable arrangement of the invention, the method is implemented at maturity of the plants (e.g. maize) after standard harvest of the corn on the cobs.

Step (i)

This step can be carried out by means i.e. of a conventional mower, reaper harvester, thresher, or combined harvester-thresher, during a first passing in the field.

Step (ii) c& (iii)

Advantageously, the less leafy stalk segments to be cut in step (ii) have a minimum diameter larger than or equal to 10 mm, to 15 mm or even to 20 mm, preferably comprised between 10 and 50 mm, and more preferably between 15 and 40 mm.

Preferably, the steps (ii) & (iii) are implemented by an usual agricultural machine which is able to cut and to collect the less leafy stalk segments during a second passing in the field.

After the harvest step (iii) of the less leafy stalks, these latter are preferably immediately loaded into transportation means. They are then transferred to an area where they are stored before being processed in the following steps of the method according to the invention.

Step (iv)

The transformation of the less leafy stalk segments into stalk sections is preferably done by means of a classical cutter/chopper used in agricultural mechanization. The stalk sections produced in step (iv) comprise at least 50% by weight of the leaf matter of the less leafy stalk segments.

Step (v)

Step (v) can be assimilated to a threshing.

Preferably:
 the stalk sections of step (iv) are transported and suspended in an air flow for their processing according to step (v);
 the stalk sections of step (iv) are also cut for their processing according to step (v);
 the mechanical impact provided to the stalk sections of step (iv) in the course of step (v) is preferably done at least partially by the combination,
  on the one hand, of the collision of the stalk sections on the move in the air flow with at least one rotor of at least one fan generating the air flow, and,
  on the other hand, of the cutting which is preferably implemented by blade(s)/knife(s) which are advantageously located on said rotor(s).

According to a peculiar implementation of the invention, the 3 fractions f1-f2-f3 are extracted from their transporting air flow before the separation step (vi), preferably by means of at least one cyclone.

Concerning the elongated fiber pieces, there are preferably a maximum length of in mm and in an increasing order of preference—100; 90; 80; 70; 60; 50; and a maximum thickness of in mm and in an increasing order of preference—20; 15; 10; 8; 6; 5.

Combined Steps (iv) & (v)

Steps (iv) & (v) can be carried out by a single device comprising successively a cutter then a thresher working as above explained.

Step (vi)

In a remarkable way of processing, the separation of the 3 fractions f1-f2-f3 according to step (vi), comprises a $1^{st}$ separation of the 2 fractions f1-f2 from the fraction f3, and a $2^{nd}$ separation of the fraction f1 from the fraction f2;
 the $1^{st}$ separation being preferably done by means of at least a coarse-mesh sieve with a mesh width preferably ≥40 mm and more preferably ≥60 mm;
 the $2^{nd}$ separation being preferably done by means of at least a slot sieve with a width preferably ≤20 mm and more preferably ≤15 mm, and even more preferably comprised between 5 and 10 mm.

The choice is done according to the invention, to use in step (vi) at least one of the sieve(s) used in the $1^{st}$ and/or in $2^{d}$ separation is a vibrating sieve.

Step (vii)

The recovery of the three fractions is done in an usual way by means of a belt conveyor, which collects the separated fractions at the end of the respective sieve part and sends the fractions to the next process or storage step, possibly by means of a pneumatic conveyor.

Optional Step (viii)

The grinding of the f1 superabsorbent pellets is done by a classical agricultural machine which could be for example a hammer mill.

Optional Step (ix)

The fractions f1-f2-f3 can be dried before further processing them.

f1 Compression

In a particular implementation of the invention, the f1 fraction is compressed by means of the press, e.g. a screw press or a hydraulic press.

Transformation of the Raw Materials Constituted by the Fraction f1 f2 f3 fraction f1

The superabsorbent pellets f1 are remarkable supports for the retention of different and numerous compounds of interest or of pollutants, as well as for the chemical and or biological conversion of these retentates.

Such a conversion is generally carried out with the aid of active ingredients which can be (co)catalysts, processing aids, microorganisms, and enzymes, activators . . . .

Said active ingredient is preferably selected in the group comprising—preferably consisting of:
 The mineral acids, preferably chosen in the sub-group comprising preferably consisting of: $H_3PO_4$, HCl, $H_3PO_4$ being particularly preferred;
 The mineral bases, preferably chosen in the sub-group comprising preferably consisting of: NaOH, $Ca(OH)_2$, KCl, . . . and their mixes;
 Pellets surface chemistry modifying agents, preferably chosen in the hydrophobizing agents or the hydrophilizing agents;
 And their mixes;

Regarding the provision of the active ingredient to the f1 superabsorbent pellets, and according to an outstanding feature of the invention, the f1 superabsorbent pellets are brought into contact with at least one active ingredient, this latter being preferably in the liquid form, preferably a solution, which is sprayed and/or wherein the f1 superabsorbent pellets are soaked.

fraction f2

According to a possibility of the invention, the f2 fraction is mechanically refined, in order to reduce the thickness Tf of the fibers as follows:
 Tf≤1 mm, and preferably Tf≤0.5 mm.

Such a refining can be done by means of dry or wet milling. The devices that could be used are for example a deflaker or a hammer mill.

In a preferable way of implementation, the f2 fraction is mechanically refined at wet stage to prepare a pulp, preferably with the addition of at least one caustic agent, sodium hydroxide (NaOH) being preferred, in order to reduce the length Lf of the fibers as follows:
 Lf≤3 mm, and preferably Lf≤2 mm.

To carry out this wet refining, it is recommendable, according to the invention, to use an adapted known equipment for the preparation of pulp. These latter could be for example a refiner or a deflaker.

The amount of caustic agent that is advantageously used is for example 1-3% sodium hydroxide for creation of an aqueous solution and soaking of the material therein, or a ratio of 3-20% sodium hydroxide on dry weight of the fibres. This wet refining makes it also possible to adjust the tensile index (TIf) of the fibres, for example as follows: TIf>30 Nm/g, and preferably TIf>40 Nm/g.

Such refined fibres are particularly adapted for making of Kraft paper, or for improvement of waste paper based cardboard.

2. The Device

In another of its aspects, the invention pertains also to a device notably for implementing the method according to the invention and as above defined, said device comprising:
 (m.i) Means for cutting the maize stalks planted in the ground of the field below the lowest maize cob of the stalks; said means (m.i) being preferably the means of
i.a a conventional mower, a reaper, a harvester, a
thresher, or a combined harvester-thresher (m.ii) Means for cutting the less leafy stalk segments;

(m.iii) Means for harvesting the less leafy stalk segments cut in step (ii); said means (m.ii) and (m.iii) being preferably the means of i.a an usual agricultural machine, such as a self-loading cutter vehicle;

(m.iv) Means for cutting the in step (iii) harvested less leafy stalk segments into stalk sections;

(m.v) Means for providing a mechanical impact to the stalk sections of step (iv);

(m.vi) Means for separating the 3 fractions f1-f2-f3 from each other, said means preferably comprising at least a coarse-mesh sieve with a mesh width preferably ≥40 mm and more preferably ≥60 mm and at least a slot sieve with a width preferably ≤20 mm and more preferably ≤15 mm, and even more preferably comprised between 5 and 10 mm; said sieve; at least one of said sieve(s) being a vibrating sieve;

(m.vii) Means for recovering the three fractions f1-f2-f3;

(m.iv'&-v') Possibly means for generating an air flow preferably a fan equipped with at least one rotor and blade(s)/knife(s), for transporting the stalk sections of step (iv);

(m.vi') Possibly at least one cyclone for extracting the 3 fractions f1-f2-f3 from their transporting air flow.

A preferred implementation of the method and a preferred embodiment of a sub-device according to the invention, corresponding to the means (m.iv) to (m.ix), is shown on the enclosed drawings in which.

Figure 1:
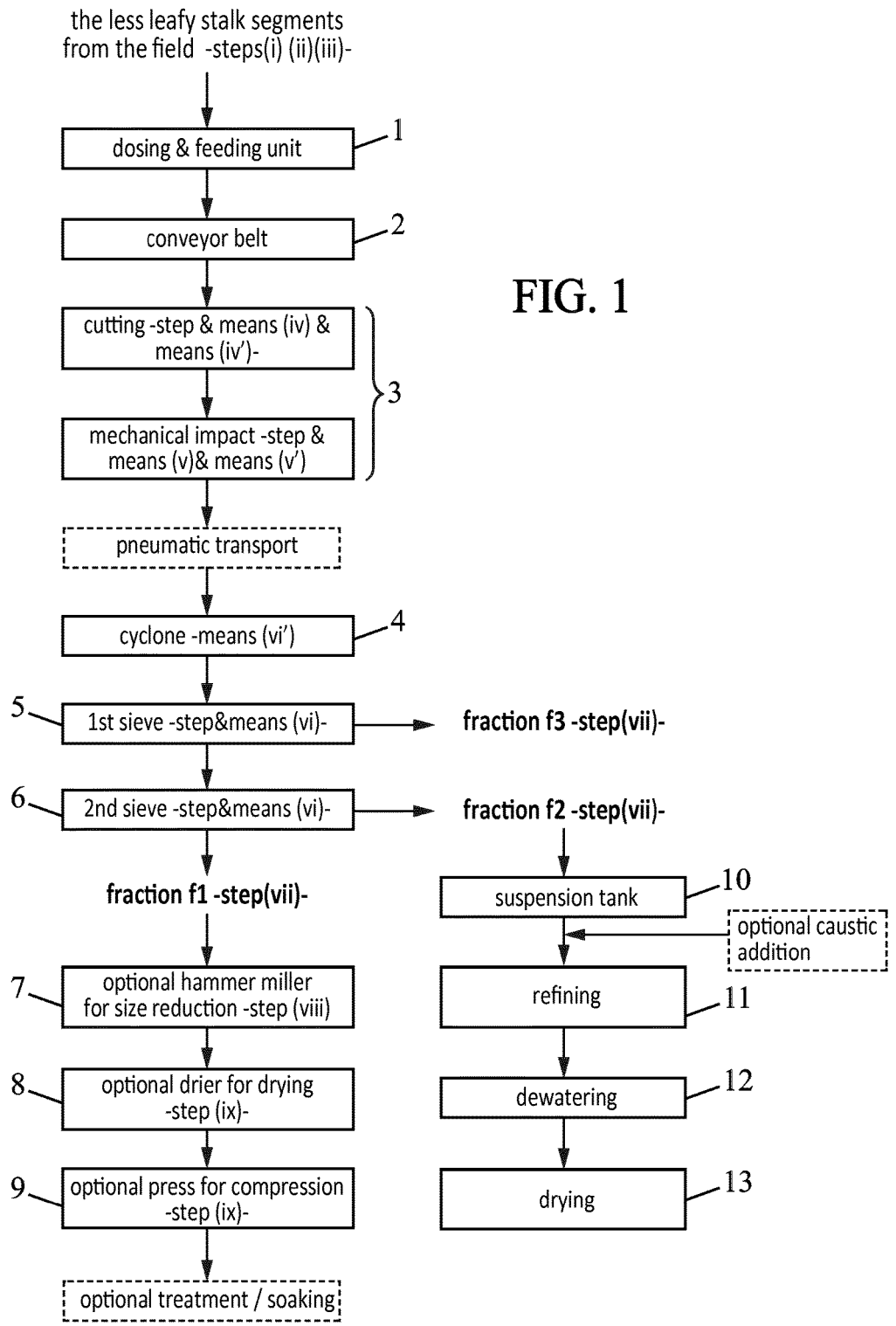
FIG. 1 is schematic view of the preferred method & sub-device.

The sub-device of FIG. 1 comprises a dosing & feeding unit 1, which delivers the less leafy stalk segments cut in step (ii) to a conveyor belt 2. This latter carries them to the assembly 3 comprising cutting means (means m.iv & iv') and impacting or hitting (means v & v').

Figure 2:
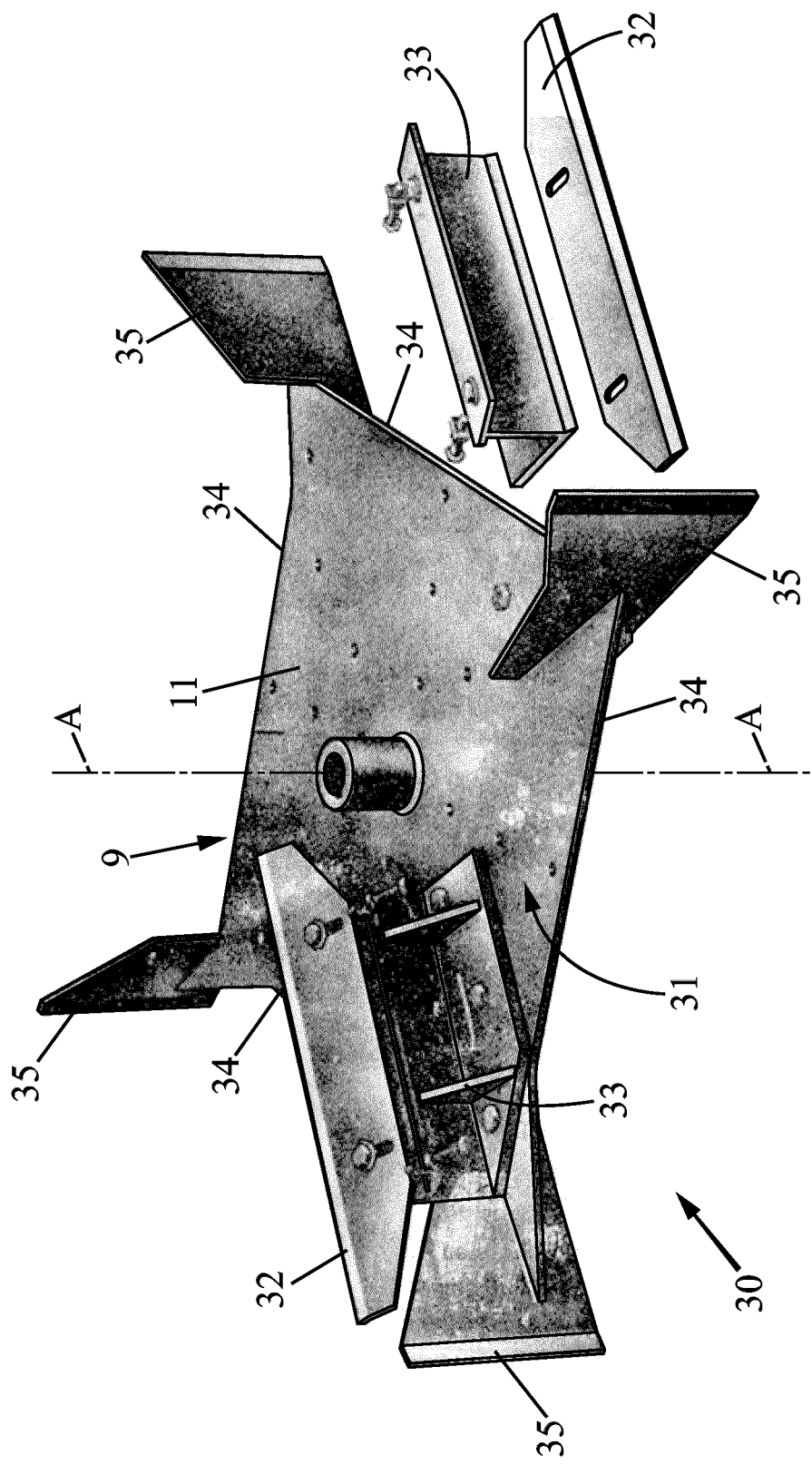
FIG. 2 is perspective view of the particular means (iv)(v) (iv')(v') of the sub-device of FIG. 1

In this preferred embodiment, the assembly 3 for cutting the in step (iii) harvested less leafy stalk segments into stalk sections and for providing a mechanical impact to said stalk sections are integrated in a single subset which is shown on FIG. 2. This integrated subset is advantageously a fan 30 made of one rotor bearing and blade(s)/knife(s). Said fan 30 is rotary around an axis (A), which is parallel to the airflow and which is preferably also the axis of the conduct wherein the airflow circulates. Preferably, the fan 30 comprises a solid boss 31 which extends in a plane orthogonal to the axis (A). One or several (here 2) cutters 32 are fixed each by means of a support 33, on the upstream face of the boss 31, whereas the peripheral edge 34 of the boss 31 is fitted with blades 35, which planes are substantially diametral.

Said assembly 3 also generates an air flow for conveying (pneumatic transport) the mixture f1/f2/f3 to a cyclone (means m.vi), which separates the air flow from the mixture f1/f2/f3 and which transfer this mixture to a $1^{st}$ coarse-mesh vibrating sieve 5 (means m.vi) and followed by a $2^{nd}$ vibrating slot sieve 6 (means m.vi). Some recovery means (vii) (for example conveyor belts and pneumatic conveyors), make it possible to get separately the 3 fractions f1 [$2^{nd}$ sieve filtrate]/f2 [$2^{nd}$ sieve retentate]/f3 [$1^{st}$ sieve retentate].

For the f1 pellets, the following transformation chain can comprise a hammer mill 7 for size reduction, a drier 8, and a press 9, before further transformation treatment like soaking in an active ingredient to be fixed on the support made of the pellets f1.

For the f2 fibrous material, the following transformation chain can comprise a suspension tank 10, to prepare a suspension of f2 in water, wherein caustic liquid can be added, a refiner 11, means for dewatering 12, and a drier 13.

3. The Products Made From f1 & f2 Fractions
fraction f1

The fraction f1 is composed of superabsorbent pellets, which can be obtained notably from the method according to the invention. They are made of the spongy/porous stalk pith of monocotyledonous flowering plants (preferably maize). They are characterized by at least one the following features:

an water absorption capacity—expressed in multiple of its own dry weight and given hereafter in an increased order of preference—greater than or equal to 15; 17; 19 and comprised between 20-50; 20-40; 20-35; 20-30;

a density in a non-compressed form—expressed in kg of dry matter per $m^3$ and given hereafter in an increased order of preference—comprised between 10-100; 20-70; 25-50; 20-30;

density in a compressed form—expressed in kg/m3 and given hereafter in an increased order of preference—greater than or equal to 100; 200; 300; 400; and comprised between 100-700; 200-700; 300-700;

a pellet maximum dimension (PMD)—expressed in mm and given hereafter in an increased order of preference: 5≤PMD≤30; 6≤PMD≤20; 8≤PMD≤15;

or comprised between 0.1≤PMD<5; 0.3≤PMD≤3; 0.5≤PMD≤2.

The absorption performances of these pellets are outstandingly optimized since they are only constituted (or almost >90% by weight) of the spongy parenchymatous pith of monocotyledonous flowering plants (preferably maize). In particular, these pellets are free from bark (f2) which has been well removed from the pith. It gives a full access to the very interesting absorption properties of the porous structure of the plant pith.

The water absorption capacity is measured by soaking of the pellets derived from step (viii) in water for 60 seconds, decanting of the surplus water, determination of the total weight, and dividing the total weight by the initial dry weight of the pellets.

The other advantageous properties of the pellets are the resistance to acid and caustic treatment, the very low nutrient content, the high mechanical pressure resistance, and the small pore size, giving a very large inner surface.

For example, the pellets before step (viii) do not show any visual effect after being soaked in 2 M $H_3PO_4$ for 8 months. The nutrient analysis of the pellets gives ash 9.6%, total nitrogen 6.6 g/kg, phosphorus 0.8 g/kg, potassium 30 g/kg, calcium 1.6 g/kg, and magnesium 0.9 g/kg. The low nutrient content is a limiting factor to microbial growth. A weight load of 500 kg/$m^2$ on a fully soaked bed of the pellets before step (viii) resulted in a reduction of the bed thickness of only less than 20%. The average pellets pores size is lower than or equal to 0.5 mm.

Concerning the size of the pellets, the coarse range of pellet maximum dimension (PMD)—which is: 5≤PMD≤30 offers different properties from those of the fine range of PMD 0.1≤PMD<5.

Indeed, a bed of coarse range pellets before step (viii) gives large interstitial spaces between the pellets, and results in a far lower air pressure difference across the bed. This is a critical advantage in certain filter applications.

The fine range pellets offer much faster and more complete moisture uptake compared to coarse range pellets. This is a critical advantage in certain plant substrate compositions.

The compressed pellets offer critical advantages for material storage and transport. Furthermore, the liquid absorption characteristics of the coarse range pellets are much improved, when the pellets are compressed. Upon soaking, the compressed pellets quickly absorb liquid to their full capacity and swell to the original volume. This is a critical advantage when preparing chemically treated coarse range pellets for certain filter applications.

fraction f2

The invention relates also to a fibrous fraction f2 comes from the stalk bark and has:
- an water absorption capacity—expressed in multiple of its own dry weight—greater than or equal to 5, preferably to 6, and more preferably comprised between—in an increased order of preference—4 and 15; 5 and 10; 6 and 9;
- the 1-dimensional single fibers randomly oriented in a bed of fibers, forming a 3-dimensional material with large pores.

This fibrous nature is clearly distinct from the parenchymatous structure of the pith f1, regarding different aspects: biological, physical, chemical.

For example, the two materials can be distinguished e.g. by pore size (much smaller pores within the f1 pellets), absorption capacity (much larger for the f1 pellets), desorption capacity (much higher water desorption of the f2 fraction), inner surface (much higher within the f1 pellets).

Absorption apart, another advantageous property of the fibrous fraction f2 is the development of strong inter-fiber bonding upon material drying. This effect is attributed to the high cellulose content and the presence of free OH-groups on the surface of the cellulose.

The raw fraction f2 can be refined to produce fibers having the following features thickness Tf, Length Lf:
- $Tf \leq 1$ mm,
- $Lf \leq 30$ mm, Such fibers can be used e.g. as a peat replacer.

Further refining, with the addition of a caustic agent, results in fibers having the following features Length Lf, and Tensile Index TIf:
- $Lf \leq 3$ mm
- $TIf > 30$ Nm/g In terms of properties, the refined fibrous fraction f2 differs from the non-refined fibers by its finer structure, the larger surface per unit weight, and the better expression of the bonding properties upon treatment with a caustic agent. The latter is of critical importance for applications in the paper and cardboard sector.

Compositions made from fraction f1 and/or fraction f2

The superabsorbent pellets f1 and the fibrous material f2 are prime ingredients for the preparation of different compositions which are intending to be used the in different fields: chemical treatments, depollution, purification, filtration, industrial processing aid, crop activation, . . . . .

So, the invention also concerns a composition comprising:
- c.1. superabsorbent pellets f1, according to the invention;
- c.2. at least one binder selected in the group comprising—preferably consisting of:
  - natural binders preferably chosen in the sub-group comprising preferably consisting of: starch, cellulose, glucose and derivatives;
  - synthetic polymers, including fibers preferably chosen in the sub-group comprising—preferably consisting of: polyester (PE), polypropylene (PP), polylactic acid (PLA), PLA being particularly preferred;
  - And their mixes;
- c.3. Possibly at least one agent for retardation of flames and/or inhibition of microbial growth and/or hardening of the composition;
- c.4. Possibly at least one mineral filler preferably chosen in the group comprising—preferably consisting of: clay powder, gypsum, calcium carbonate, calcium oxide, and their mixes;
- c.5. Possibly Fibrous matter f2;
- c.6. And possibly mixes of c.1 with at least one the components c2 to c.5.

According to a particular embodiment of the invention, said composition can be composed of:
- c.1 superabsorbent pellets f1 included in the fine range of PMD such as:
  - $0.1 \leq PMD < 5$;
- c.2. at least one binder as above defined;
- c.50. refined fibrous matter f2.

According to another particular embodiment of the invention, the binder can be waterproof.

Products Made from these Compositions

The above defined composition can be used to produce manufactured products obtained by forming of the compositions as above defined, said products being preferably in the form of cubes and/or slabs.

The forming can be done by molding, extrusion or any appropriate transformation technique, for example any technique used into transformation of plastic materials.

The form of the product can be of any type: plates, strips, wires, bowls . . . And any split elements issued therefrom.

Cubes anti/or slabs can be suitable to constitute specific substrates for plants, composts, carrier for fertilizers, crop medias. In this perspective, these elementary forms of the products (cubes and/or slabs) can be packaged in bags, preferably plastic bags and more preferably biodegradable plastic bags such as PLA bags. Such bags can be used for the propagation of young plants, the production of tomatoes, strawberries and similar, e.g. in greenhouses. In such applications, they can replace substrates like stone wool, which come in non-biodegradable bags and need to be disposed of at considerable cost. The cubes and slabs based on f1 and f2, and in PLA coverage offer similar plant growth perspective, and can be composted after the plant harvest.

4. The Uses of the f1 & f2 Fractions, of the Compositions and the Products Made Therefrom According to another of its aspects, the invention relates to different uses:
- A. Use of the superabsorbent pellets f1 according to the invention herein defined, as absorbent/filter/elimination means of gaseous and/or liquids products originating from animal excrements, biogas production sites, meat processing sites, treatment of exhaust gas from thermal energy production, gaseous and liquid hydrocarbons, including oil and its derivatives.
- B. Use of the superabsorbent pellets f1 according to the invention herein defined, as absorbent/filter/elimination means of gaseous and/or liquids products, wherein the gaseous and/or liquids products are selected in the group comprising—preferably consisting of: $NH_3$, $CO_2$, $H_2S$, $H_2O$, smell, $CH_4$ or combinations thereof.
- C. Use of the superabsorbent pellets f1 according to the invention herein defined, as support for chemical/biological treatment of any substrate, said support possibly including at least one active ingredient, useful as processing aid.

D. Use:
- of the fibrous matter f2 according to the invention herein defined,
- of the fibrous matter f2 obtained by the method:
  - wherein the f2 fraction is mechanically refined, in order to reduce the thickness Tf of the fibers as follows: $Tf \leq 1$ mm, and preferably $Tf \leq 0.5$ mm;
  - or wherein the f2 fraction is mechanically refined at wet stage to prepare a pulp, preferably with the addition of at least one caustic agent, sodium hydroxide (NaOH) being preferred, in order to reduce the length Lf of the fibers as follows: $Lf \leq 3$ mm, and preferably $Lf \leq 2$ mm;
- of the compositions according to the herein defined invention;
- or of the product according to the herein defined invention;

as a plant substrate, plant substrate component and/or peat substitute;

E. Use:
- of the superabsorbent pellets f1 according to the invention herein defined as such whatever they are made,
- of the fibrous matter f2 according to the invention herein defined,
- of the fibrous matter f2 obtained by the method:
  - wherein the f2 fraction is mechanically refined, in order to reduce the thickness Tf of the fibers as follows: $Tf \leq 1$ mm, and preferably $Tf \leq 0.5$ mm;
  - or wherein the f2 fraction is mechanically refined at wet stage to prepare a pulp, preferably with the addition of at least one caustic agent, sodium hydroxide (NaOH) being preferred, in order to reduce the length Lf of the fibers as follows: $Lf \leq 3$ mm, and preferably $Lf \leq 2$ mm;
- of the compositions according to the herein defined invention;
- or of the product according to the herein defined invention; as packaging material, construction material, cat litter or components thereof.

EXAMPLES

Manufacturing Example

Example 1

Step (i)

Corn was harvested at the regular period of its harvest, using, for a first passage a conventional thresher, and cutting the stems as close as possible underneath the lowest cob, which was around 75 cm above the ground. The corn was processed and collected as usual, and the residue (chopped straw including cob pieces and leaves) were deposited on the field just as usual.

Step (ii) & (iii)

In a second passage, a tractor pulling a standard, self-loading cutter wagon collected the stem parts still standing on the field having a stem diameter around 18 mm, cutting it as low as possible (around 5 cm) above the ground, and collecting the stem pieces in integral form, at a length of around 70 cm.

Suspension of the Method

This material was transported to a central processing site, and transferred into a reception and dosing unit.

Resumption of the Method

Steps (iv) to (vi) with the Embodiment of the Device Herein Above Defined with Reference to the Enclosed FIGS. 1 & 2.

Steps (iv) & (v)

The feeding & dosing unit 1 transfers the in (iii) harvested stalk (stem) sections at the length of around 70 cm onto a feed conveyor 2, which directs it into a cutter 3 (means iv & iv'), who cuts the rigid stalk (stem) sections to a length of around 13 mm, but does not substantially cut the leaves and the leave sheaths moving into the cutter wrapped around the stems.

The so prepared material is blown by means of the fan 30 equipped with blades 35, in order to send it to a large vibrating screen assembly 5,6. The cutting, together with the hit exerted by the fan blades 35 on the material, caused the stem bark to burst, fall into elongated fiber pieces, and disintegrate from the shock-resistant spongy interior tissue of the stems. Separation of the material from the air stream and deposition onto the front end of the vibrating screen is executed by a cyclone 4 with radial intake of the air/material stream and outlet of the material through the bottom.

Step (vi)

The vibrating screen assembly 5,6 has an upper level with a screen 5 having a mesh width of 80 Mm, and a lower level with a slotted sieve 6 having a slot width of 8 mm. The vibration induced a unilateral movement of the material, towards the back end of the assembly. The upper level 5 retains the leafy parts (fraction f3) of the material, and allowed passage of the elongated fiber pieces (fraction f2) and the three-dimensional pieces of spongy tissue (fraction f1). On the lower level, the slotted sieve 6 allows the passage of the elongated fiber pieces (fraction f2), but retains the 3-dimensional pieces of spongy tissue/superabsorbent pellets (fraction f1).

Step (vii)

Three material fractions f1-f2-f3 are collected from this procedure: A leave fraction f3, a fraction of fiber pieces f2, and a spongy tissue fraction f1. The leave fraction f3 yields around 40% by volume or 10% by weight, the fiber fraction f2 yields around 30% by volume and 70% by weight, and spongy tissue fraction f1 yields around 30% by volume and 20% by weight, always compared to the volume and weight of the less leafy stalk segments cut in step (ii) and harvested in step (iii), as delivered to the assembly 3 comprising cutting means (means m.iv & iv') and impacting means (means v & v').

Step (viii)

The spongy tissue fraction f1 is disintegrated into smaller pieces and dried, depending on its utilization.

Further Processing

For preparation of an absorbent of ammonia, 5 liters of f1 not disintegrated but dried are first compressed using a hand press for removal of air contained in the porous structure of the sponge tissue and then submersed in a 20% solution of phosphoric acid. This resulted in maximum uptake of phosphoric acid and maximum removal capacity of ammonia in the filter.

30 kg of the fiber fraction f2 was sent to a suspension tank, which was equipped with a stirrer for preparation of a homogenous suspension and filled to the level of 1'000 liters. This suspension was sent through a deflaker, type EK1 from Voith, for opening and washing of the elongated fiber pieces and preparation of fibers useful e.g. for replacement of peat. Further refining of the fibers on a laboratory scale, using a kitchen mixer, with or without addition of caustic agents such as caustic soda, produced excellent pulp qualities for production of high shear sheets or card board.

It has to be understood, that the thickness and moisture content of the stem pieces as delivered to central site depend on the general climatic conditions, the plant variety, and the conditions in a specific growth season. It also has to be understood, that the yield of the various fractions will vary depending on the thickness and moisture content of the incoming stem pieces, as well as on the bulk height of the fractions as collected.

Assessment of the f1&f2 Fractions and Application Examples

Example 2

The superabsorbent pellets thus produced are an open-pored granulates with a white to beige color and good bulk capability. It is mainly composed of cellulose and hemicellulose and low in nutrients. In a grain size of 2-10 mm, the density is 20-30 kg/m$^3$. The spongy tissue is extremely absorbent and can take up 20- to 25-times its own weight of water or any other liquid. The water absorption capacity is independent of the salinity of the water and remains even after repeated interim drying of the material exist. Experiments have shown that compression of the spongy tissue does not reduce its absorption capacity. The material swells with absorption of the liquid to its original volume.

The spongy tissue is milled to a granule size between 2-5 mm, and material thus prepared used for planting trials as well as to create a water desorption curve (standard test procedure). It is found that the material is capable of holding more than 35% of its original water content, even at elevated suction pressure of >1 pF and so limits the dehydration of a substrate with an efficiency similar to the best stone wool substrates.

Example 3

The superabsorbent pellets are compressed with a hydraulic press to obtain pellets with a diameter of 65 mm and a height of 17 to 30 mm. It was found that the superabsorbent pellets compressed under a pressure of up to 3 t (relative to an area with a diameter of 65 mm) are not dimensionally stable and easily expand again after relaxation, without any external assistance. Under a pressure of 6 t [based on an area with a diameter of 65 mm] dimensionally stable compacted pellets are prepared. They have a density of >400 kg/m3.

The pellets were then cut into smaller pieces of about 2-5 grams. 17 g of this material was weighed into a bencher, then 500 ml of water were added. There was a rapid expansion of the material by taking up water. After about 60 seconds, excess water was decanted. The weight of the water-saturated material is 391 g, so that the material absorbs a weight of water corresponding to 22 times its own weight.

The compression and swelling properties of the material is of great practical importance, because thereby the storage and transport costs can be significantly reduced.

Example 4

Superabsorbent pellets are mixed adhesive with biodegradable fibers of polylactic acid (hereinafter PLA) and then pressed and formed under the action of hot air into plates. The proportion by weight of PLA fibers is 12% of the product weight. These water-resistant plates are dimensionally stable and have a density of 56 kg/m3. These plates are cut into 4×4×4 cm cubes for assisting plants growth. These cubes are tested for the production of young plants. It was found that the water-holding capacity (weight of fully loaded cube after soaking/dry weight of the cube) is better and the germination rate of tomato seed on these cubes is equal to the stone wool comparison (around 95%).

With a nutrient solution or a saline solution in place of water, the absorption capacity of any superabsorbent pellets, stays constant, even with repeated wetting cycles with intermediate drying.

Example 5

The superabsorbent pellets are treated with an aqueous solution of phosphoric acid ($H_3PO_4$), and then dried and compressed. The so produced pellets have a high ability to absorb and neutralize a liquid. These pellets are used in chickens farming for the removal of feces smell and for keeping dry the stable floor. Through the lowering of pH, ammonia is converted to ammonium, with much lower vapor pressure. Thus, the harmful ammonia emissions are greatly reduced, also valuable nitrogen fertilizer is so bound to the pellets which are substrate, that can be used as a plant nutrient.

Example 6

The superabsorbent pellets are sprayed with an aqueous solution of sodium hydroxide (NaOH) or calcium hydroxide (CaOH). The so provided material and equipment are used to remove carbon dioxide ($CO_2$) from an air stream. As the air flow goes through the pellets, the carbon dioxide contained therein reacts with the sodium hydroxide to sodium bicarbonate ($NaHCO_3$) and sodium carbonate ($Na_2CO_3$) or to calcium carbonate ($CaCO_3$), which remains adsorbed to the inner surface of the pellets as a salt and then provides to a removal of carbon dioxide from the air stream. The removal of $CO_2$ from the air is an eager issue notably in the intensive livestock farming, where the $CO_2$ concentration must be specifically monitored and kept low.

Similarly, the superabsorbent pellets can be loaded by means of appropriate treatments with specific features to allow the adsorption of other contaminants, such as hydrocarbons or undesirable odors, which are sent through a bed of the pellets. In all these applications, the large inner surface of the superabsorbent pellets is selectively used, similar to the use of activated carbon as an adsorption surface.

The active ingredient to be fixed to the superabsorbent pellets is depending on the chemical properties of the pollutant to remove. For example the use of hydrophobic or cationic or anionic species as active ingredients in the superabsorbent pellets, makes it possible to produce replaceable filtering units.

The high internal surface of the superabsorbent pellets and the reactive OH groups of cellulose including in said pellets, favors a strong loading.

Alternatively, the fractions f1-f2 can be used as the fraction f3 for heating or food or feed components, or industrial applications not mentioned above. In particular, the f1 and f2 fractions can be used as nutrient fibers in dough preparations, as fillers and homogenizers in paint formulations, and similar. These pellets have e.g. a calorific value of about 17 MJ/kg, an ash content of 6-7, and a nitrogen content of about 0.8%.

The invention claimed is:

1. A method for the production notably of superabsorbent pellets and/or of a fibrous material from crop residues of monocotyledonous flowering plants cultivation, comprising the following steps:
   (i) cutting the maize stalks planted in the ground of the field below the lowest cob of the stalks, so that leafy stalk segments stay on the field; each less leafy stalk segment including a spongy core, a stalk bark wrapping the core and a leafy matter wrapping the stalk bark or born by the stalk;

(ii) cutting the less leafy stalk segments as close to the ground as possible;

(iii) harvesting the less leafy stalk segments cut in step (ii);

(iv) cutting the less leafy stalk segments harvested in step (iii) into stalk sections which largest dimension in mm is comprised between 5-50;

(v) providing a mechanical impact to the stalk sections of step (iv) so as
to separate spongy cores from stalk barks, as well as the leafy matter,
to transform said stalk barks into elongated fiber pieces; and to obtain a mix containing:
f1. said spongy cores forming a superabsorbent pellets fraction which water absorption capacity expressed in multiple of its own dry weight is greater than or equal to 15;
f2. said elongated fiber pieces forming a fibrous matter fraction;
f3. and said leaf matter forming a leafy fraction, the superabsorbent pellets fraction, the fibrous matter fraction, and the leafy fraction forming three fractions;

(vi) separating the three fractions from each other;

(vii) recovering the three fractions f1-f2-f3;

(viii) optionally reducing the f1 superabsorbent pellets up to a smaller pellet size to have a largest dimension in mm be between 0.1-20 mm.

2. Method according to claim 1 which is discontinuous and comprises a $1^{st}$ stage in the field, wherein the steps (i), (ii), (iii) are implemented, a $2^{nd}$ stage of transportation of the harvested less leafy stalk segments, from the crop site to an optional storage area and/or to a processing site, an optional $3^{rd}$ stage of storage, and a final stage of processing the less leafy stalk segments, wherein the steps (iv) and the followings steps are implemented.

3. Method according to claim 1, wherein the less leafy stalk segments to be cut in step (ii) have a minimum diameter larger than or equal to 10 mm.

4. Method according to claim 1,
wherein the stalk sections of step (iv) are transported and suspended in an air flow for processing according to step (v),
wherein the stalk sections of step (iv) are also cut for processing according to step (v).

5. Method according to claim 4, wherein the three fractions f1-f2-f3 are extracted from the transporting air flow before the separation step (vi).

6. Method according to claim 1, wherein the separation of the 3 fractions f1-f2-f3 according to step (vi), comprises a $1^{st}$ separation of the fractions f1-f2 from the fraction f3, and a $2^{nd}$ separation of the fraction f1 from the fraction f2.

7. Method according to claim 1, wherein the f1 fraction is compressed.

8. Method according to claim 1, wherein the f1 superabsorbent pellets are brought into contact with at least one active ingredient.

9. Method according to claim 8 wherein the active ingredient is selected from the group consisting:
mineral acids;
mineral bases;
pellets surface chemistry modifying agents;
and mixtures thereof.

10. Method according to claim 1 wherein the f2 fraction is mechanically refined, in order to reduce a thickness Tf of the elongated fiber pieces as follows:
Tf≤1 mm.

11. Method according to claim 1, wherein the f2 fraction is mechanically refined at wet stage to prepare a pulp, in order to reduce a length Lf of the elongated fiber pieces as follows:
Lf≤3 mm.

12. Superabsorbent pellets f1, obtained from the method according to claim 1, made from the spongy/porous stalk core of monocotyledonous flowering plants and having:
a water absorption capacity expressed in multiple of its own dry weight greater than or equal to 15;
and/or a pellet maximum dimension (PMD) expressed in mm:
5≤PMD≤30;
or comprised between 0.1≤PMD<5.

13. Fibrous matter f2, obtained from the method according to claim 1, made from the stalk bark of monocotyledonous flowering plants and having:
a water absorption capacity expressed in multiple of its own dry weight greater than or equal to 5;
and a 3-dimensional porous structure.

14. Composition comprising:
c.1. superabsorbent pellets f1 obtained by the process of claim 1 and having a water absorption capacity expressed in multiple of its own dry weight greater than or equal to 15 and/or a pellet maximum dimension (PMD) expressed in mm 5≤PMD≤30 or comprised between 0.1≤PMD≤5;
c.2. at least one binder selected from the group consisting of:
natural binders;
synthetic polymers, including fibers;
and their mixes;
c.3. optionally at least one agent for retardation of flames and/or inhibition of microbial growth and/or hardening of the composition;
c.4. optionally at least one mineral filler selected from the group consisting of: clay powder, gypsum, calcium carbonate, calcium oxide, and their mixes;
c.5. optionally fibrous matter f2 made from the stalk bark of monocotylendonous flowering plants and having a water absorption capacity expressed in multiple of its own dry weight greater than or equal to 5 and a 3-dimensional porous structure;
c.6. and optionally mixes of c.1 with at least one of the components c.2 to c.5.

15. Products obtained by forming of the composition according to claim 14, the products comprising one or more members selected from the group consisting of cubes, slabs, plates, strips, wires, and bowls, and split elements thereof.

16. Method for absorbing/filtering/eliminating gaseous and/or liquid products originating from animal excrements, biogas production sites, meat processing sites, treatment of exhaust gas from thermal energy production, gaseous and liquid hydrocarbons, including oil and its derivatives, the gaseous or liquid products selected from the group consisting of $NH_3$, $H_2S$, $H_2O$, $CO_2$, and $CH_4$, said method comprising using superabsorbent pellets f1 according to claim 12 for the absorbing/filtering/eliminating of the gaseous or liquid products.

17. Method for chemically/biologically treating of any substrate, consisting in using the superabsorbent pellets f1 according to claim 12 as a support when chemically/biologically treating the substrate.

18. A device for implementing the method according to claim 1, comprising:
- (m.i) first cutters for the maize stalks planted in the ground of the field below the lowest maize cob of the stalks;
- (m.ii) second cutters for the less leafy stalk segments;
- (m.iii) harvesters for harvesting the less leafy stalk segments cut in step (ii);
- (m.iv) third cutters for cutting the harvested less leafy stalk segments into stalk sections;
- (m.v) mechanical impacters for impacting the stalk sections of step (iv);
- (m.vi) separators for separating the three fractions f1-f2-f3 from each other, at least one of said separators being a vibrating sieve;
- (m.vii) recoverers for recovering of the three fractions f1-f2-f3;
- (m.iv'&-v') optionally generators of an air flow, for transporting the stalk sections of step (iv);
- (m.vi') optionally at least one cyclone for extracting the three fractions f1-f2-f3 from the transporting air flow.

\* \* \* \* \*